No. 728,074. Patented May 12, 1903.

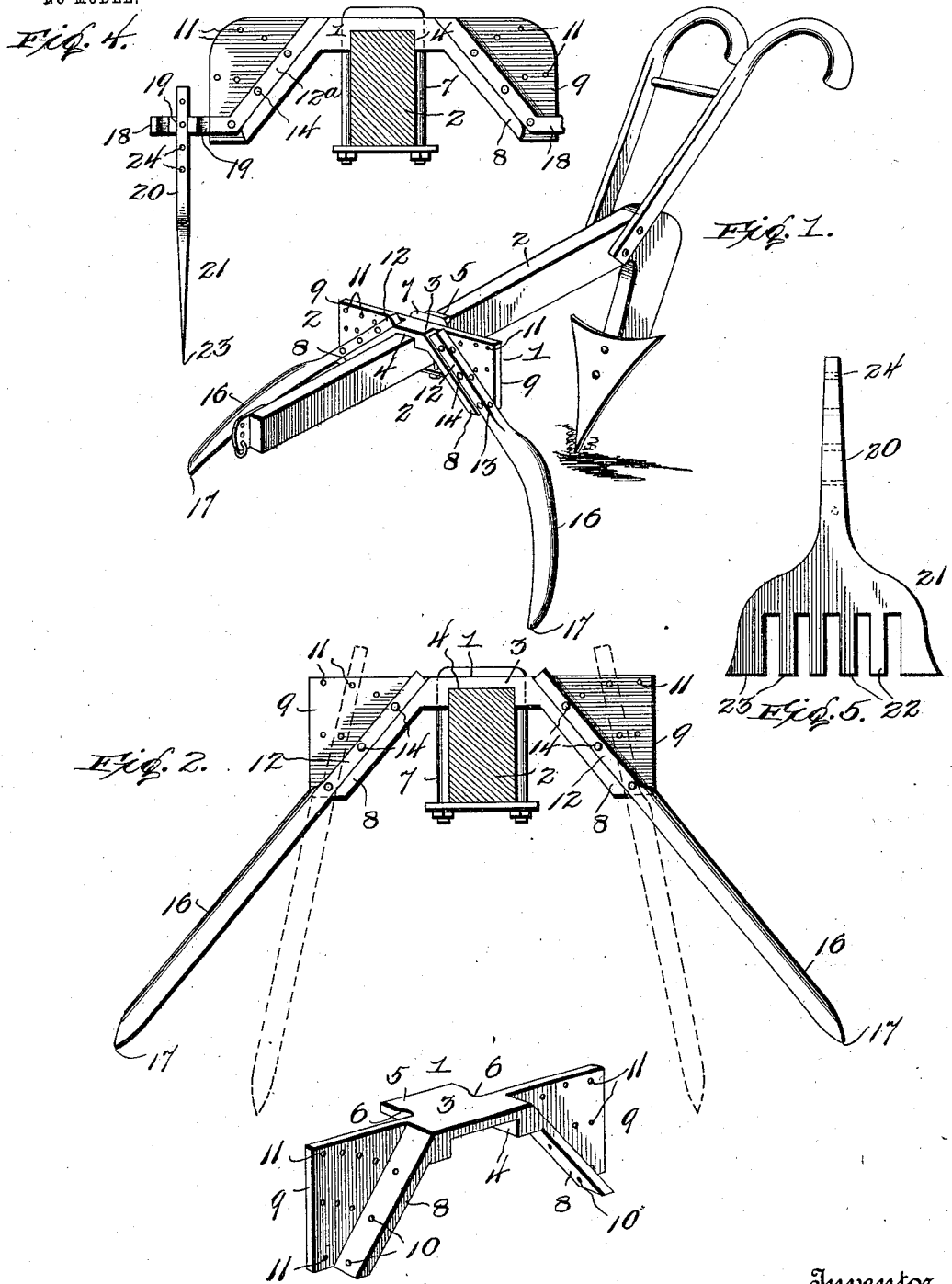

UNITED STATES PATENT OFFICE.

ISAAC W. BASS, OF SMITHFIELD, NORTH CAROLINA.

PLANT-PROTECTOR ATTACHMENT FOR PLOWS.

SPECIFICATION forming part of Letters Patent No. 728,074, dated May 12, 1903.

Application filed February 7, 1903. Serial No. 142,272. (No model.)

*To all whom it may concern:*

Be it known that I, ISAAC W. BASS, a citizen of the United States, residing at Smithfield, in the county of Johnson and State of North Carolina, have invented certain new and useful Improvements in Plant-Protector Attachments for Plows, of which the following is a specification.

This invention relates to plow attachments, and has special reference to those of the fender type acting in the capacity of protectors or guards to the vegetation or plants along the rows being plowed for cultivating purposes.

To this end the invention contemplates a simple and practical form of plant-protector in the form of an attachment readily adaptable to the beam of any ordinary type of cultivator or plow and comprising means for effectually protecting the plants in the rows being cultivated.

The invention also has in view a protector attachment comprising novel means for securing a wide range of adjustment for the oppositely-extending fender members, whereby the same may be adapted to the size of the plants and the different conditions to be met with in cultivating any particular row.

Another object is to provide a form of attachment which is readily convertible for use in connection with the cultivation of different kinds of plants. In the carrying forward of this object the invention is designed particularly as a protector for tobacco during the cultivation thereof or as a protector for young cotton when siding the latter.

With these and many other objects in view, which will more readily appear as the nature of the invention is better understood, the same consists in the novel construction, combination, and arrangement of parts, which will be hereinafter more fully described, illustrated, and claimed.

The essential features of the invention involved in the carrying out of the objects above indicated are necessarily susceptible to a wide range of modification without departing from the spirit or scope of the invention; but the preferred embodiments thereof are shown in the accompanying drawings, in which—

Figure 1 is a perspective view of an ordinary plow, such as used for cultivating tobacco, showing the plant-protector attachment in its applied position and illustrating the employment of fender members designed particularly for the protection of the tobacco-leaves during the cultivation of the plant. Fig. 2 is an enlarged cross-sectional view illustrating more plainly the adjustable mounting of the fender members. Fig. 3 is a detail in perspective of the saddle-member attachment which is detachably clamped to the beam and carries the fender members. Fig. 4 is a cross-sectional view similar to Fig. 2, showing the use of the invention with a different form of fender member designed particularly for the protection of young cotton. Fig. 5 is a detail view of the fender member shown in Fig. 4.

Like reference-numerals designate corresponding parts throughout the several figures of the drawings.

In carrying out the invention there is employed a main support or carrier constituting the supporting and carrying means for the fender members and adapted to be detachably fitted to the beam of the plow or cultivator. This main support or carrier essentially consists of a saddle member (designated in the drawings by the numeral 1) adapted to be placed astride the beam 2 of the plow or cultivating implement with which the attachment may be used. The saddle member 1 is designed to be placed transversely across the top of the implement-beam 2 at an intermediate point between the opposite ends thereof and is usually formed of a single block or casting. The block or casting constituting the saddle member 1 essentially consists of a cross-head 3, provided at the lower side thereof with a stirrup-notch 4, receiving and fitting over the upper side of the beam 2, as plainly shown in Figs. 1 and 2 of the drawings, and at one side thereof the cross-head 3 of the saddle member is provided with a laterally-offset securing tongue or tongue-plate 5, fitting flat on the upper side of the beam and having notched edge portions 6 to receive the side legs of the clip-bolt or equivalent fastening 7. The clip-bolt or equivalent fastening 7 is usually of the conventional "U" form and is placed astride of the beam and also extends over the top of the securing tongue or tongue-plate to provide for firmly clamping the saddle member to the beam. The stirrup-notch 4, in conjunction with the fastening means coöperating with the tongue or tongue-plate 5, provides a rigid interlocked connection between the saddle member and the beam that effectually prevents the former from twisting or otherwise shifting from its operative position during the use of the plow or cultivator.

The cross-head 3 of the saddle member is formed at the ends thereof with the oppositely-located pendent supporting-arms 8, which are downwardly divergent and have associated therewith the upright supplemental supporting back flanges 9. There is an upright supporting back flange 9 associated with each of the supporting-arms 8, and the same is preferably projected integrally from the rear edge of the arm 8 and is of a materially greater width than the same, each of the said back flanges 9 being of such extent to not only extend along the full length of the arm 8 with which it coöperates, but also to project a material distance beyond the oblique plane of the upper side or face of the arm 8, so as to present a widened or expanded adjustment-surface for the fender members carried by the saddle member.

The oppositely-located downwardly-divergent supporting-arms 8 of the saddle member are provided therein with a series of bolt-holes 10, and the upright back flanges arising from one edge of the said arms are also provided with several sets of adjustment-holes 11, which are usually and preferably arranged in concentric relation, as may be plainly seen from Figs. 2 and 3 of the drawings, to permit of any desired pitch adjustment for the fender members, which are carried by the saddle member.

The fender members, irrespective of the form or use thereof, are provided with substantially straight holding-shanks 12, preferably of angular form in cross-section, so as to properly register in the angle between the supporting-arms 8 and the supporting back flanges 9 of the saddle member, as shown in Figs. 1, 2, and 4 of the drawings. These holding-shanks of the fender members are designed to receive the separate sets of fastening-bolts 13 and 14, respectively. When the said shanks 12 of the fender members are placed flat against the upper sides of the supporting-arms 8, and therefore have the same inclination as the said arms, the fastening-bolts 13 pass downwardly through the shanks and also through the bolt-holes 10 in the arms 8, while the other series of fastening-bolts 14 may pass laterally or horizontally through the shanks 12 and the adjustment-holes 11 of the back flanges 9, which are in position for receiving such bolts.

When it is desired to change the pitch, dip, or vertical angle of the fender members, the fastening-bolts 13, which engage the supporting-arms 8, are removed to permit the shanks 12 to be swung through an arc across the face of the back flanges 9 to any required position, such as indicated by the dotted lines in Fig. 2 of the drawings, in which position the fender members are held fast by the bolts 14 being secured through other of the adjustment-holes 11. This construction not only provides for a firm fastening of the fender members to their support or saddle member, but at the same time permits of a wide range of adjustment both lengthwise along the arms 8 and also in a lateral direction across the face of the flanges 9 to adapt the fenders to any particular conditions which may be met with—such, for instance, as different widths of rows and different sizes of plants.

In the employment of the invention as a tobacco-plant protector the fender members consist of the holding-shanks 12 and the guarding elements 16, preferably formed integrally with the shanks and essentially consisting of forwardly-curved horn-like sweeps having rounded back portions and pointed extremities 17, which pointed extremities travel sufficiently close to the ground to thoroughly protect the young tobacco-leaves when siding. In carrying out this function the horn-like sweeps constituting the guarding elements lift the tobacco-leaves, thereby preventing them from being covered up, while at the same time permitting the dirt to be worked close to the stalks of the plant.

A modified form of fender member is suggested in Figs. 4 and 5 of the drawings; but in this construction all of the essential features of mounting and adjustment previously described are preserved. In the modified form of fender member each of said fender members includes the substantially straight holding-shank, (designated by the reference character 12$^a$,) having the same adjustment and mounting as the holding-shank 12, already described in connection with the member 16. The said holding-shank 12$^a$, however, is provided at its lower end with an offstanding horizontal arm extension 18, having in one side thereof a longitudinal series of notched seats 19, any one of which is designed to receive the carrying-stem 20 of the guarding element 21 of the modified form of fender member. In this construction the guarding element 21 is in the form of a fork embodying an alined series of spaced fender-tines 22, tapering to sharpened points 23. The carrying-stem 20 of each guarding element 21 is provided with a series of bolt-holes 24, adapted to receive the fastening-bolt for securing the same in the notched seat 19 of the arm extension 18, with which it is associated.

By reason of the notched seats 19 and the bolt-holes 24 in the stem 20 of each guarding element 21 the latter is capable of adjustment in a direction toward or from the plow-beam and also in a vertical direction. In their operative positions the guarding elements 21, which are arranged, respectively, at opposite sides of the plow-beam, have their tined heads disposed in parallelism to the line of draft, so as to travel edgewise during the use of the plow. The tined construction of guarding elements is of special utility for the protection of young cotton when siding to prevent the same from being covered up, while at the same time permitting the dirt to be thrown close to the stalks.

Other modified forms of fender members could obviously be employed without departing from the invention. It will therefore be understood that changes in the form, proportion, and minor details of construction may be resorted to without departing from the spirit of the invention or sacrificing any of the advantages thereof.

Having thus described the invention, what is claimed, and desired to be secured by Letters Patent, is—

1. A plant-protector attachment for plows comprising a saddle member adapted to be placed crosswise of the beam and provided with oppositely-located downwardly-divergent supporting-arms, separate fender members arranged at opposite sides of the beam and having holding-shanks arranged on the supporting-arms and having an up-and-down arcuate adjustment to vary the dip of the fender members, and fastening means for securing the holding-shanks in any of their adjusted positions, substantially as set forth.

2. A plant-protector attachment for plows comprising a saddle member adapted to be placed crosswise of the beam and provided with oppositely-located pendent downwardly-divergent supporting-arms and upright supporting back flanges arising from said arms, and the separate fender members arranged at opposite sides of the beam and having holding-shanks adapted to be secured upon the supporting-arms and also having an arcuate adjustment across the face of the back flanges to vary the dip of the fender members.

3. A plant-protector attachment for plows comprising a saddle member consisting of a cross-head provided in its under side with a stirrup-notch to fit the beam and with a laterally-offset securing-tongue fitting on top of the beam, said cross-head being further provided with oppositely-located pendent supporting-arms and upright supporting back flanges arising from the arms and formed with several sets of adjustment-holes, a fastening-clip embracing the beam and said securing-tongue, and the separate fender members arranged at opposite sides of the beam and having guarding elements and also holding-shanks, the latter being adapted to be fastened to the supporting-arms and also to the said back flanges in different positions.

4. A plant-protector attachment for plows comprising a saddle member adapted to be placed crosswise of the beam and provided with oppositely-located supports, and the fender members detachably and adjustably fitted to said supports, each fender member consisting of a holding-shank having a horizontal notched extension, and a guarding element provided with a stem adjustably fastened to the extension and with a fork consisting of a plurality of sharpened points.

5. A plant-protector attachment for plows comprising a saddle member adapted to be placed crosswise of the beam and having oppositely-located pendent downwardly-divergent supporting-arms and upright supporting back flanges arising from said arms, and fender members having shanks coöperating with the supporting-arms and back flanges to vary the position of said fender members.

In testimony whereof I affix my signature in presence of two witnesses.

ISAAC W. ✕ BASS.
his mark

Witnesses:
F. H. BROOKS,
J. T. ELLINGTON.